United States Patent [19]
Johnson

[11] Patent Number: 5,433,416
[45] Date of Patent: Jul. 18, 1995

[54] ARTICLE SUPPORT SYSTEM

[76] Inventor: Ruben R. Johnson, 3609 W. Castile Ct., Peoria, Ill. 61615

[21] Appl. No.: 179,158

[22] Filed: Jan. 10, 1994

[51] Int. Cl.$^6$ ............................................. A47F 7/14
[52] U.S. Cl. .................................. 248/475.1; 403/381
[58] Field of Search ............... 247/475.1, 223.3, 223.4, 247/224.3, 224.4, 314, 489, 477, 496, 224.1; 403/381, 383

[56] References Cited

U.S. PATENT DOCUMENTS

| | | |
|---|---|---|
| D. 329,192 | 9/1992 | Susac . |
| 2,732,159 | 1/1956 | Connors et al. . |
| 2,887,233 | 5/1959 | Bybee . |
| 3,294,355 | 12/1966 | Topf ............................... 248/489 X |
| 3,622,116 | 11/1971 | Fellows ........................ 248/224.1 X |
| 3,840,261 | 10/1974 | Fulkerson et al. . |
| 3,878,589 | 4/1975 | Schaefer . |
| 3,915,189 | 10/1975 | Holbrook et al. ............. 248/223.4 X |
| 3,928,894 | 12/1975 | Bury et al. .................... 248/223.4 X |
| 4,176,580 | 12/1979 | Gallegos ....................... 248/224.1 X |
| 4,858,869 | 8/1989 | Stang ............................. 248/314 X |
| 5,026,016 | 6/1991 | Lisowski .......................... 248/314 |
| 5,086,958 | 2/1992 | Nagy ............................. 248/223.4 X |

FOREIGN PATENT DOCUMENTS

| | | |
|---|---|---|
| 626684 | 9/1961 | Canada . |
| 1317285 | 1/1963 | France . |
| 2422369 | 11/1979 | France . |
| 753778 | 8/1956 | United Kingdom . |
| 1016563 | 1/1966 | United Kingdom . |
| 1077792 | 8/1967 | United Kingdom . |

*Primary Examiner*—Ramon O. Ramirez
*Attorney, Agent, or Firm*—John R. Hoffman

[57] ABSTRACT

An article support system is provided for detachably mounting an article on a support structure. The system includes a bracket plate adapted to be attached to one of the article or the support structure. The bracket plate includes a key-way having side walls diverging from a front face of the bracket plate to a rear there thereof. The key-way extends through the bracket plate between the front and rear faces and includes an entry mouth opening at an edge of the bracket plate. A supporting key is adapted to be attached to the other of the article or the support structure. The supporting key is positionable through the entry mouth of the key-way and has side walls converging from a front face of the key to a rear face thereof for mating proximity to the diverging side walls of the key-way in the bracket plate. The invention contemplates that the bracket plates can be stacked with their first faces in abutment to define a dual key-way of a generally hour-glass cross-sectional configuration, or the bracket plates can be stacked with their second faces in abutment to define a dual key-way of a generally truncated diamond cross-sectional configuration, with the supporting keys being stacked to form corresponding mating assemblies.

14 Claims, 4 Drawing Sheets

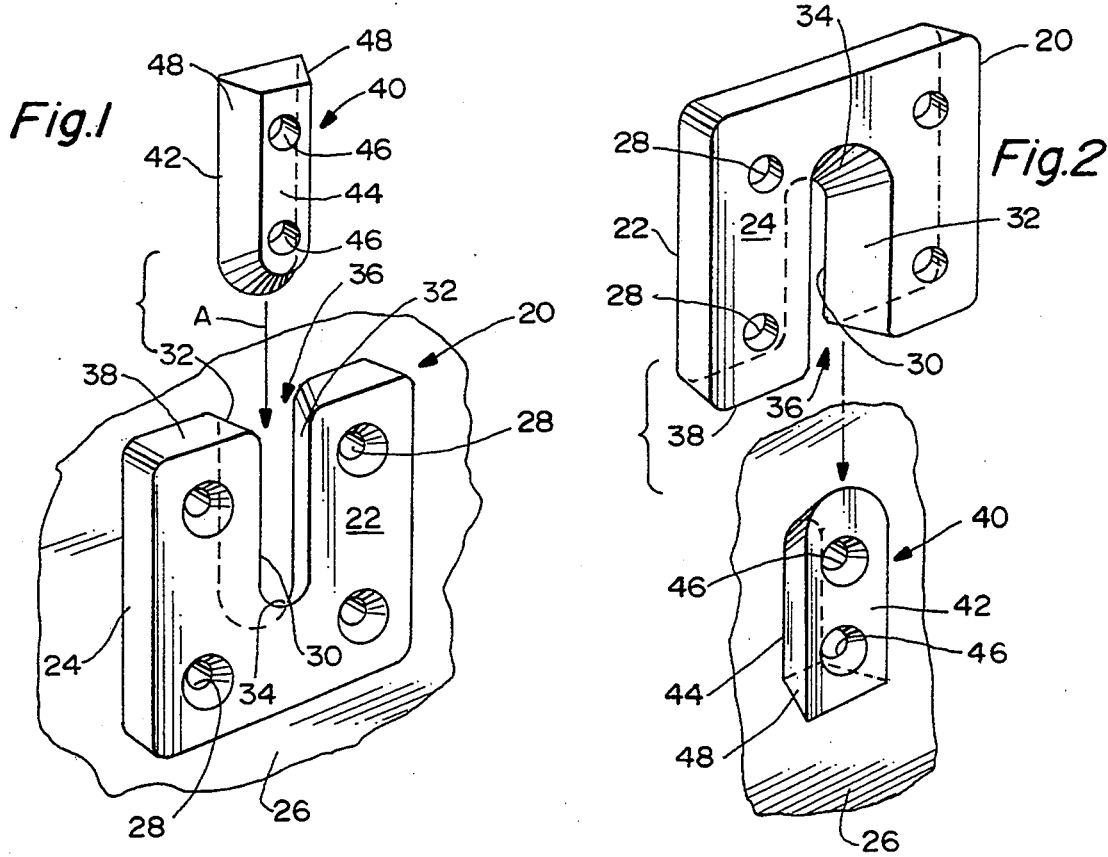
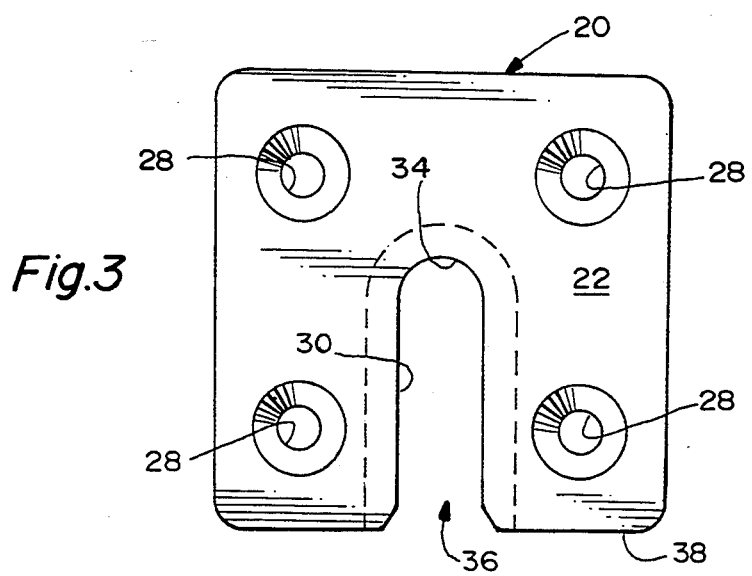
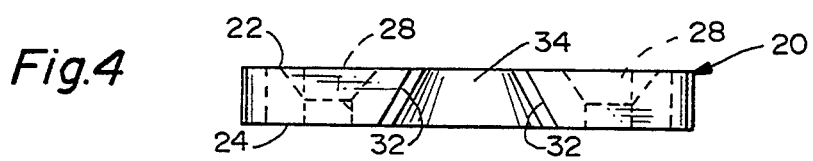

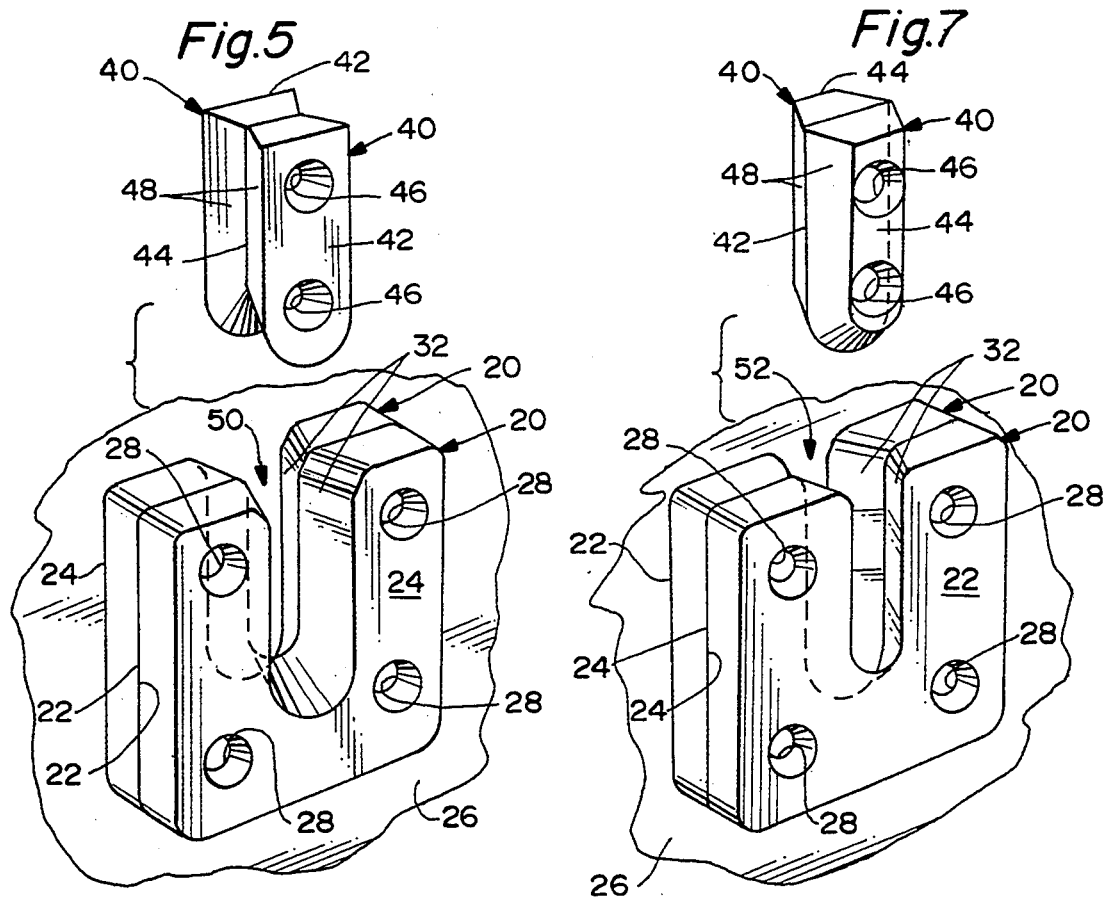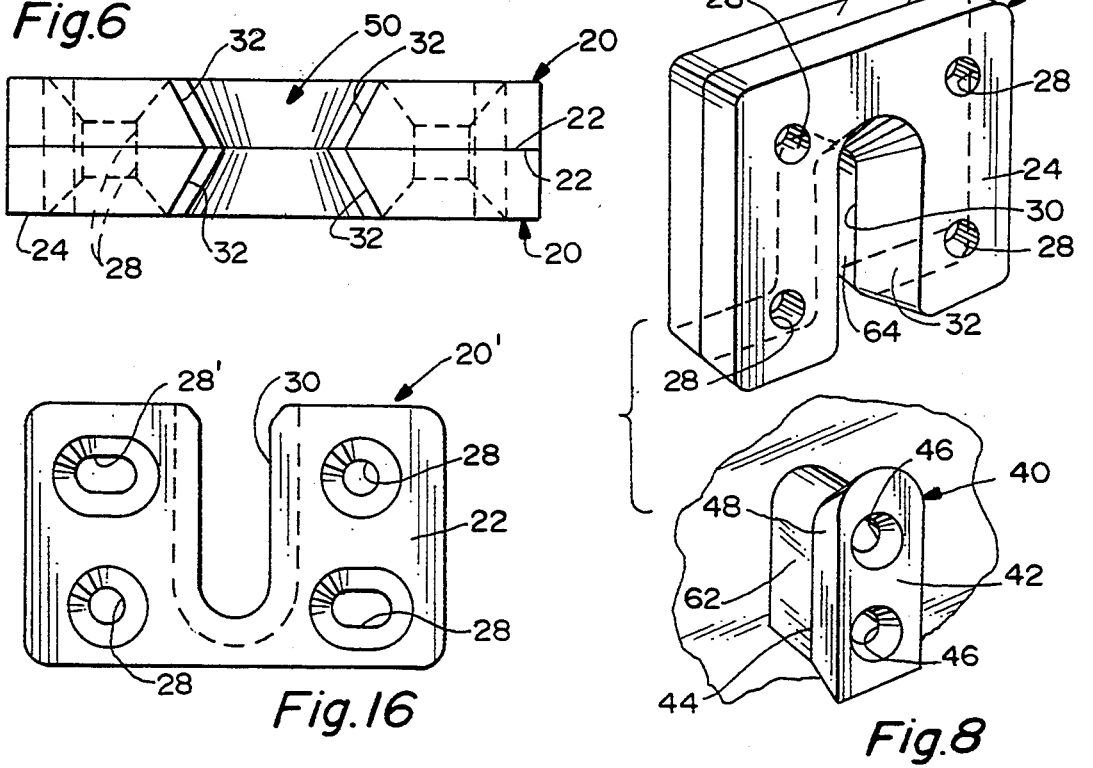

Fig.9
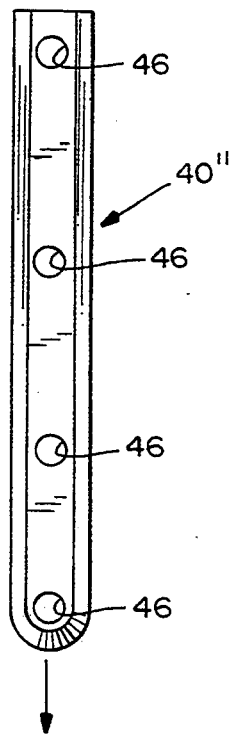
Fig.10
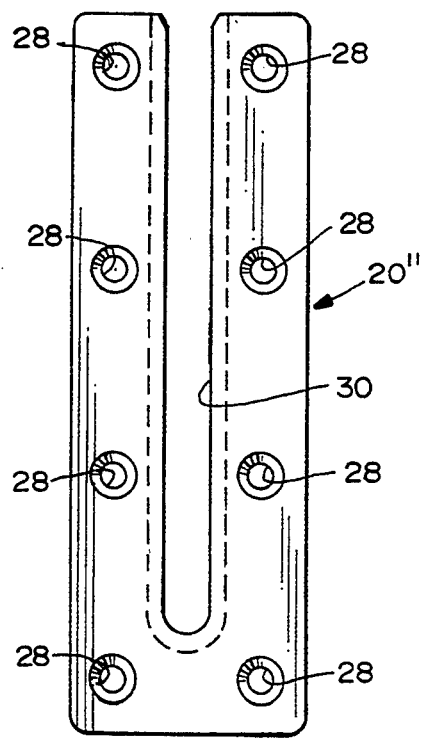
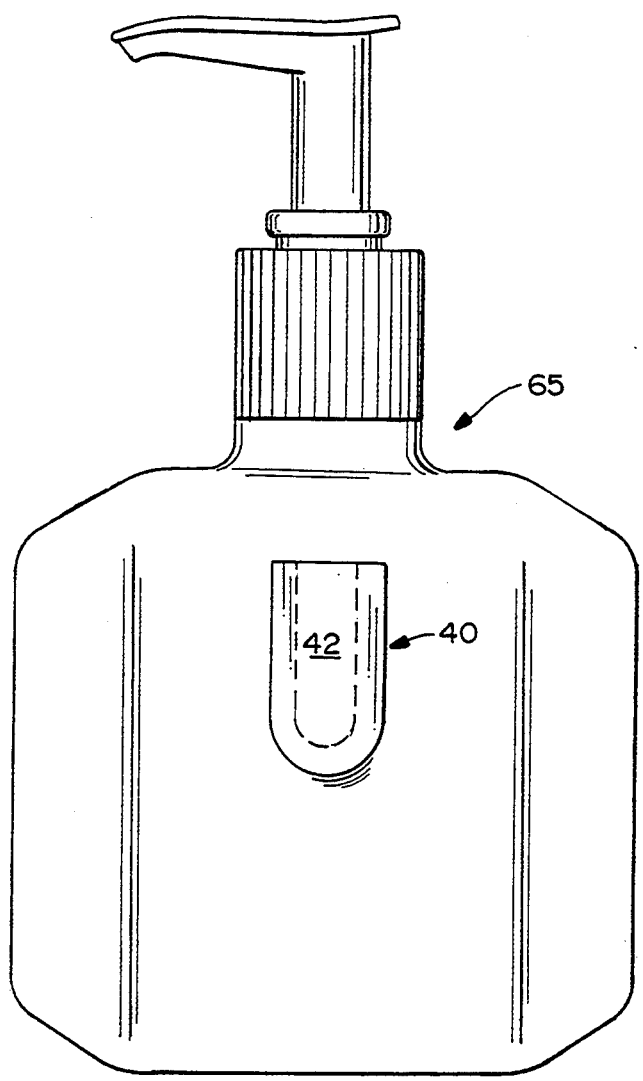
Fig.11

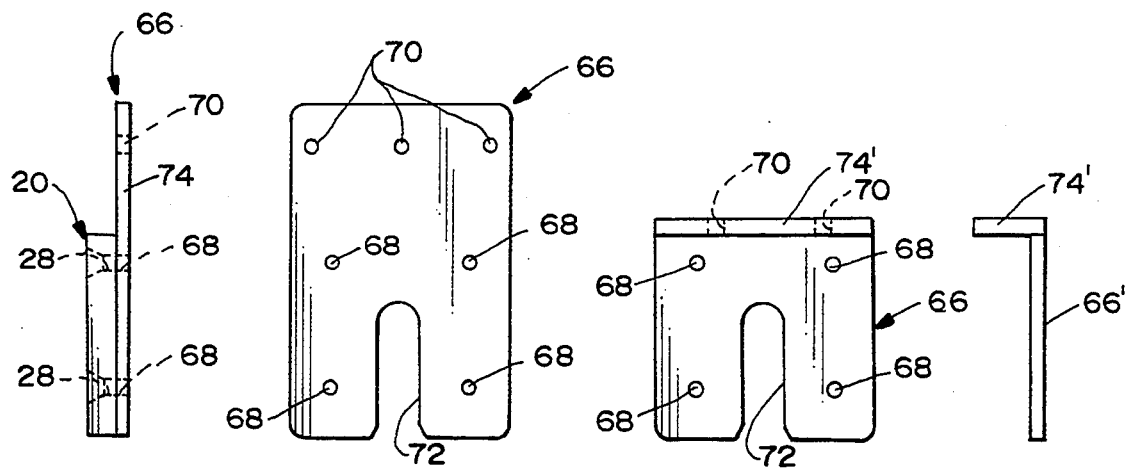
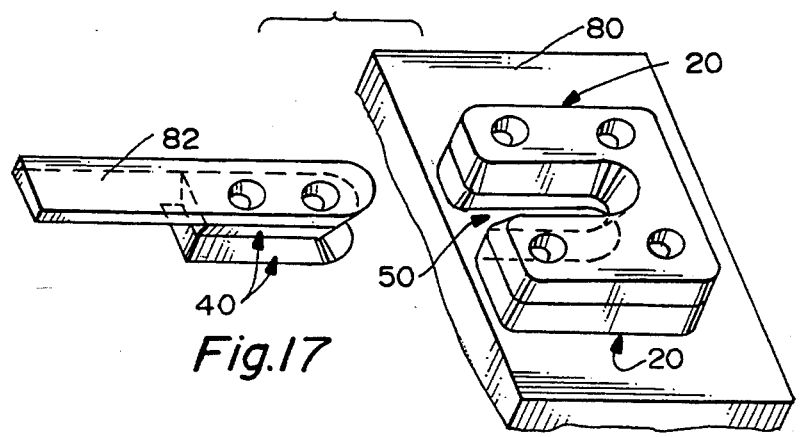
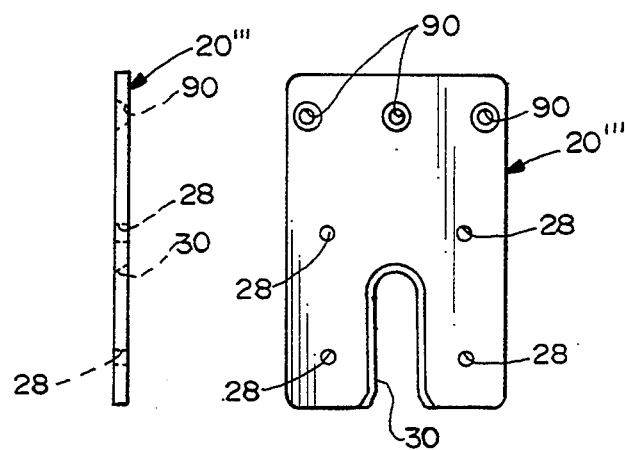

ARTICLE SUPPORT SYSTEM

FIELD OF THE INVENTION

This invention generally relates to the art of brackets, clips and the like for mounting articles to supporting surfaces or structures and for supporting articles in general and, particularly, to an article support system for detachably mounting an article on a support structure.

BACKGROUND OF THE INVENTION

There have been a wide variety of mounting brackets, retainer clips, fastening devices and the like for fastening two bodies together, such as removably or detachably mounting an article to a support structure, such as a wall or other support surface. Examples of some such devices are shown in U.S. Pat. Nos. 2,732,159 to Connors et al, dated Jan. 24, 1956; 2,887,233 to Bybee, dated May 19, 1959; 3,840,261 to Fulkerson et al, dated Oct. 8, 1974; 3,878,589 to Schaefer, dated Apr. 22, 1975; 5,026,016 to Lisowski, dated Jun. 25, 1991; and Des. 329,192 to Susac, dated Sep. 9, 1992, as well as Canadian Patent No. 626,684, dated Sep. 5, 1961; British Patent Specifications 753,778, published Aug. 1, 1956, and 1,077,792, published Aug. 7, 1967; and French Patent Publications 1.317.285 (1963) and 2.422.369 (1979).

All of the items of prior art listed above show one form or another of a mounting system which includes some form of a bracket for mounting on a support structure, the bracket having a key-way for receiving a supporting key or keyed clip for detachably mounting an article on the support structure. Most often the key-ways/keys are wedge shaped which can cause binding between the bracket and the clip. Invariably, all of the brackets in this body of prior art have key-ways which are closed. In other words, the key-ways are open in a front face of the brackets, but the back sides of the key-ways are closed by walls of the brackets. Such structures create limitations on the uses of the support systems. Closed key-ways, for instance, have a tendency to cause binding and even a "lock-up" condition between the two interengaged bodies. This is particularly problematic with heavy bodies or objects.

The present invention is directed to a novel article support system which includes two basic components, namely a bracket plate having a key-way therein which is open through opposite faces of the bracket, and a supporting key for detachable insertion into the key-way. The bracket plate is adapted to be attached to either an article or a support structure and, similarly, the supporting key is adapted to be attached to the opposite of the article or support structure. With the key-ways in the bracket plates being completely open, potential binding is substantially eliminated, and the bracket plates, as well as the supporting keys, can be stacked or reversed in a variety of orientations depending upon the use of the support system. The key-ways/keys preferably have straight sides to further eliminate potential binding.

SUMMARY OF THE INVENTION

An object, therefore, of the invention is to provide a new and improved article support system for detachably mounting an article to a support structure.

In one exemplary embodiment of the invention, at least a pair of substantially identical bracket plates are provided, with each plate including a singular key-way extending completely through the plate between opposite first and second faces thereof. The key-way has side walls diverging from the first face to the rear face of the plate. The key-way has an entry mouth opening at an edge of the plate. Therefore, the bracket plates can be stacked for attachment to either one of the article or the support structure, with the first faces of the brackets in abutment to define a first dual key-way of a generally hour-glass cross-sectional configuration, and the bracket plates can be stacked with their second faces in abutment to define a second dual key-way of a generally truncated diamond cross-sectional configuration.

At least a pair of substantially identical supporting keys are adapted to be attached to the other of the article or support structure. Each supporting key has side walls converging from a first face of the key to a second face thereof. Therefore, the supporting keys can be stacked for attachment to the other of the article and support structure with their first faces in abutment and inserted through the entry mouths of the stacked bracket plates when their first faces are in abutment, and the supporting keys can be stacked with their second faces in abutment and insertable through the entry mouths of the stacked bracket plates when their second faces are in abutment.

As disclosed herein, the side walls of the bracket plates and the side walls of the supporting keys may be generally parallel. If so, the key-ways have closed ends opposite the entry mouths thereof.

The bracket plates have fastening apertures which are in alignment when the plates are stacked with either of their first and second faces in abutment. The keys also have fastening apertures which are in alignment when the keys are stacked.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1, is a perspective view of one of the bracket plates mounted to a support structure such as a wall, in conjunction with one of the supporting keys;

FIG. 2 is a view similar to that of FIG. 1, but with the supporting key attached to a support wall;

FIG. 3 is a plan view of one of the bracket plates;

FIG. 4 is a front end elevational view of the bracket plate in FIG. 3;

FIG. 5 is a perspective view of a pair of the bracket plates stacked to define a combined key-way having an hour-glass cross-sectional configuration, along with a pair of supporting keys stacked for use with the stacked bracket plates;

FIG. 6 is an end elevational view of the stacked bracket plates in FIG. 5;

FIG. 7 is a perspective view of a pair of bracket plates stacked such that the combined key-way thereof has a generally truncated diamond cross-sectional configuration, along with a pair of supporting keys stacked for use with the stacked bracket plates;

FIG. 8 is a perspective view of a bracket plate stacked with a simple spacer, in conjunction with a supporting key stacked with a corresponding spacer;

FIG. 9 is a plan view of an alternate form of an elongated bracket plate;

FIG. 10 is a plan view of a supporting key for use with the bracket plate of FIG. 9;

FIG. 11 is a side elevational view of an article having one of the supporting keys secured thereto;

FIG. 12 is a plan view of a thin mounting plate for mounting one of the bracket plates;

FIG. 13 is a side elevational view of the mounting plate of FIG. 12, with one of the bracket plates secured thereto;

FIG. 14 is a plan view of a thin mounting plate having an angled mounting lip;

FIG. 15 is a side elevational view of the mounting plate of FIG. 14;

FIG. 16 is a plan view of one of the bracket plates with elongated mounting holes;

FIG. 17 is a view similar to that of FIG. 5, with the stacked supporting keys fixed to the end of a pick-up arm;

FIG. 18 is a plan view of another form of a thin bracket plate; and

FIG. 19 is an edge view of the bracket plate of FIG. 18.

DETAILED DESCRIPTION OF THE PREFERRED EMBODIMENTS

Referring to the drawings in greater detail, and first to FIG. 1, a bracket plate, generally designated 20, is illustrated as embodying the concepts of the invention. The bracket plate has a first or front face 22 and a second or rear face 24, the rear face being secured to a support structure, such as a wall 26. The bracket plate includes a plurality of holes 28 for receiving appropriate fastening devices, such as screws, for mounting the plate to the wall. The bracket plate further includes a key-way 30 having tapered side walls 32 which diverge from first face 22 to rear face 24 of the bracket plate. In other words, the key-way is open entirely through the bracket plate. The tapered side walls of the key-way are generally parallel and extend between a closed end 34 of the key-way and an open entry mouth, generally designated 36, opposite the closed end at an edge 38 of the bracket plate.

Still referring to FIG. 1, the article support system includes a supporting key, generally designated 40, which has a first or front face 42 and a second or rear face 44. The key has a plurality of holes 46 through which appropriate fasteners, such as screws, can be used to mount the key to an article with the rear face 44 abutting the article. The key has generally parallel tapered side walls 48 which converge from front face 42 to rear face 44. Therefore, the key is insertable through mouth 36 in the direction of arrow "A", into key-way 30 until the key seats at the closed end 34 of the key-way.

FIG. 2 shows one of the bracket plates 20 and one of the supporting keys 40 in a reversal of use from that shown in FIG. 1. In other words, the supporting key 40 is secured to a support structure such as a wall 26', with the rear face of the key abutting the support wall. Bracket plate 20, conversely, is secured with its rear face 24 against the article to be supported. The particular use shown in FIG. 2 might be appropriate where it is desirable to support an article on a narrow support surface which is narrower than bracket plate 20. FIGS. 3 and 4 simply show plan and side elevational views, respectively, of one of the bracket plates 20 to show the details thereof.

FIGS. 5 and 6 show a pair of bracket plates 20 which are stacked for attachment to either an article or a support structure. The bracket plates are stacked with their first faces 22 in abutment. In this stacked arrangement, the side walls 32 of the respective key-ways in the bracket plates combine to define a dual key-way, generally designated 50, of a generally "hour-glass" cross-sectional configuration as clearly shown in FIG. 5. Similarly, as seen in FIG. 5, a pair of supporting keys 40 are correspondingly stacked such that the side walls of the stacked keys are configured for insertion into the hour-glass configured key-way 50 of the stacked bracket plates in FIGS. 5 and 6.

FIG. 7 shows a pair of stacked bracket plates 20 with their second or rear faces 24 in abutment such that the side walls 32 of their respective key-ways combine to define a dual key-way, generally designated 52, which has a generally truncated diamond cross-sectional configuration. Correspondingly, a pair of supporting keys 40 are stacked as shown in FIG. 7 such that the side walls of the stacked keys combine to define a configuration for insertion into the diamond-shaped key-way 52 of the stacked bracket plates shown in FIG. 7.

By stacking the bracket plates and the supporting keys as shown in FIGS. 5 and 6 or in FIG. 7, accommodation can be made for using the plates and keys in applications where either the article or the support structure has a recessed surface to which the brackets or keys must be secured.

FIG. 8 shows a simple spacer plate 60 for backing one of the bracket plates 20 and a key spacer 62 for backing one of the supporting keys 40. The spacer plate has a slot 64 corresponding to the narrowest dimension between walls 30 of bracket plate 20, and key spacer 62 has a width corresponding to the narrowest dimension between side walls 48 of supporting key 40. These spacer plates and key spacers simply can be used as alternatives for spacing the bracket plates and supporting keys from the surfaces of an article or a support structure where the surfaces are somehow recessed. However, such spacer plates and key spacers require the provision of additional components, versus the simple stacking of the bracket plates and supporting keys as shown in FIGS. 5–7 and described above.

FIGS. 9 and 10 show a bracket plate, generally designated 20" (FIG. 9) and a supporting key, generally designated 40" (FIG. 10) which are elongated and provide additional holes 28 and 46, respectively, for securing the bracket plate and the supporting key to either an article or a support structure. These elongated plates and keys would be used in situations where there is a significant tendency for twisting between the supported article and the support structure. Otherwise, the bracket plate and the supporting key are structurally and functionally the same as bracket plate 20 and supporting key 40 in FIGS. 1 and 2, and corresponding like reference numerals have been applied in FIGS. 9 and 10.

FIG. 11 simply shows one of the supporting keys 40 secured to the outside of a dispenser, such as a soap dispenser, generally designated 65. One of the bracket plates 20 can be secured to a wall, such as in a bathroom shower, and the soap dispenser can be detachably mounted on the wall by means of the bracket plate. Rather than having fastening holes, the supporting key can be secured to the dispenser by an adhesive. This is but one of a myriad of uses of the article mounting support system of the invention.

FIGS. 12 and 13 show a thin mounting plate, generally designated 66, having four fastening apertures 68 and an additional three fastening apertures 70, along with a slot 72. This thin mounting plate is larger than one of the bracket plates 20 and is provided for attachment to a narrow portion of an article or a support structure which cannot accommodate attachment of one of the bracket plates. Specifically, reference is made to FIG. 13 where it can be seen that one of the bracket plates 20 is positioned on thin mounting plate 66 such that a lip portion 74 of the mounting plate projects above the bracket plate. Apertures 68 may be used for securing bracket plate 20 to mounting plate 66, and apertures 70 in lip portion 74 can be used for fastening this assembly to a narrow support surface, for instance.

Referring to FIGS. 14 and 15, another thin mounting plate, generally designated 66', is illustrated and is used the same as mounting plate 66 in FIG. 13. However, with mounting plate 66' in FIGS. 14 and 15, the lip portion 74' is generally perpendicular to the remainder of the mounting plate so that the lip portion can be secured to a support structure, whereupon one of the bracket plates 20 can be secured thereto.

FIG. 16 shows a bracket plate 20' which has two elongated holes 28' through which fastening screws can be inserted and allow for positional adjustment of the plate before fastening screws are inserted into holes 28 to fix the position of the bracket plate on the support structure.

FIG. 17 shows a supporting system wherein a pair of bracket plates 20 and a pair of supporting keys 40 are arranged in configurations corresponding generally to that shown in FIG. 5 and described above. However, rather than the stacked bracket plates being mounted on a supporting wall, bracket plates 20 are shown in FIG. 7 mounted on a free object 80. The stacked supporting keys are mounted on the distal end of an arm 82. This depiction represents situations where the bracket plates and the supporting keys of the invention may be used in a wide variety of applications other than mounting articles on a support surface such as a wall. For instance, arm 82 may comprise a pick-up arm of a particular machine and free object 80 is an item which must be picked up and transported from one location to another. Another example is where arm 82 could be part of a vehicle and free object 80 is one of a plurality of attachments for the vehicle, such as a front loader of a forklift vehicle. In these types of applications of the article support system of the invention, very heavy objects might be involved, and the structure of the invention, which substantially eliminates binding problems, is a most expedient advance in the art.

Lastly, FIGS. 18 and 19 show a form of a bracket plate, generally designated 20''', which includes holes 28 for receiving appropriate fastening devices for mounting the plate to a support structure, along with a key-way 30 for receiving a complementary key, similar to the structure of bracket plate 20. This plate is thinner than bracket plate 20, for instance (on the order of ¼ inch thick versus ½ inch thick). This plate can be bent to accommodate an article, such as a picture frame, with a beveled mounting surface. To that end, this plate includes three additional mounting holes 90 along the top edge thereof.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An article support system for detachably mounting an article on a support structure, comprising:

at least a pair of substantially identical bracket plates each including a singular key-way extending completely through the plate between opposite first and second faces thereof, the key-way having side walls diverging from the first face to the rear face of the plate, and the key-way having an entry mouth opening at an edge of the plate, wherein the bracket plates can be stacked for attachment to one of said article and support structure with their first faces in abutment to define a first dual key-way of a generally hour-glass cross-sectional configuration and the bracket plates can be stacked with their second faces in abutment to define a second dual key-way of a generally truncated diamond cross-sectional configuration; and at least a pair of substantially identical supporting keys adapted to be attached to the other of said article and support structure, each supporting key having side walls converging from a first face of the key to a second face thereof, wherein the supporting keys can be stacked for attachment to the other of said article and support structure with their first faces in abutment and insertable through the entry mouths of the stacked bracket plates when their first faces are in abutment and the supporting keys can be stacked with the second faces in abutment and insertable through the entry mouths of the stacked bracket plates when their second faces are in abutment.

2. The article support system of claim 1 wherein the side walls of the bracket plates and the side walls of the supporting keys are generally parallel, and said key-ways include closed ends opposite the entry mouths thereof.

3. The article support system of claim 1 wherein said bracket plates have fastening aperture means which are in alignment when the plates are stacked with either of their first and second faces in abutment.

4. The article support system of claim 1 wherein said supporting keys have fastening aperture means which are in alignment when the keys are stacked with either of their first and second faces in abutment.

5. The article support system of claim 4 wherein said bracket plates have fastening aperture means which are in alignment when the plates are stacked with either of their first and second faces in abutment.

6. The article support system of claim 1, including a thin mounting plate which is larger than the bracket plates to define a projecting lip portion of the mounting plate for attachment to a narrow portion of one of the article and support structure, and means for facilitating securing at least one of the bracket plates to the mounting plate.

7. The article support system of claim 6 wherein said lip portion of the mounting plate projects generally perpendicular to a body portion of the mounting plate to which the bracket plates are securable.

8. An article support system for detachably mounting an article on a support structure, comprising:
- a bracket plate adapted to be attached to one of said article and support structure, the bracket plate including a key-way having side walls diverging from a front face of the bracket plate to a rear face thereof, the key-way extending entirely through the bracket plate between said faces and including an entry mouth opening at an edge of the bracket plate; and
- a supporting key adapted to be attached to the other of said article and support structure, the supporting key being positionable through the entry mouth of said key-way and having side walls converging from a front face of the key to a rear face thereof for mating proximity to the diverging side walls of the key-way.

9. The article support system of claim 8 wherein the side walls of the bracket plate and the side walls of the supporting key are generally parallel, and said key-way includes a closed end opposite the entry mouth thereof.

10. The article support system of claim 8 wherein said bracket plate includes aperture means for facilitating fastening of the bracket plate to one of said article and support structure.

11. The article support system of claim 8 wherein said supporting key has aperture means for facilitating fastening of the supporting key to the other of said article and support structure.

12. The article support system of claim 11 wherein said bracket plate includes aperture means for facilitating fastening of the bracket plate to one of said article and support structure.

13. The article support system of claim 8, including a thin mounting plate which is larger than the bracket plate to define a projecting lip portion of the mounting plate for attachment to a narrow portion of one of the article and support structure, and means for facilitating securing the bracket plate to the mounting plate.

14. The article support system of claim 13 wherein said lip portion of the mounting plate projects generally perpendicular to a body portion of the mounting plate to which the bracket plate is securable.

* * * * *